US012147319B1

(12) United States Patent
Huberman et al.

(10) Patent No.: US 12,147,319 B1
(45) Date of Patent: Nov. 19, 2024

(54) SYSTEMS AND METHODS FOR ADVANCED COMMUNICATION INTERFACE ANALYSIS

(71) Applicant: CABLE TELEVISION LABORATORIES, INC., Louisville, CO (US)

(72) Inventors: Bernardo Huberman, Palo Alto, CA (US); Belal Hamzeh, Westminster, CO (US); Sayandev Mukherjee, Santa Clara, CA (US); Irene Macaluso, San Francisco, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 56 days.

(21) Appl. No.: 17/896,583

(22) Filed: Aug. 26, 2022

Related U.S. Application Data

(60) Provisional application No. 63/291,259, filed on Dec. 17, 2021, provisional application No. 63/255,427, filed on Oct. 13, 2021, provisional application No. 63/237,597, filed on Aug. 27, 2021.

(51) Int. Cl.
*G06F 11/00* (2006.01)
*G06F 11/263* (2006.01)
*G06F 11/273* (2006.01)

(52) U.S. Cl.
CPC ........ *G06F 11/2733* (2013.01); *G06F 11/263* (2013.01)

(58) Field of Classification Search
CPC ............... G06F 11/2733; G06F 11/263; G06F 11/3041; G06F 11/3051
See application file for complete search history.

(56) References Cited

U.S. PATENT DOCUMENTS

| | | | | |
|---|---|---|---|---|
| 6,802,032 | B1* | 10/2004 | Budinger | H04L 43/50 714/45 |
| 7,058,559 | B1* | 6/2006 | Roeck | H04L 41/145 725/111 |
| 9,317,412 | B1* | 4/2016 | Cohen | G06F 11/3688 |
| 2017/0149635 | A1* | 5/2017 | Kumar | H04L 43/12 |
| 2019/0356572 | A1* | 11/2019 | Rupe | H04L 69/40 |
| 2022/0157399 | A1* | 5/2022 | Hensel | G06F 11/2733 |

* cited by examiner

Primary Examiner — Joseph D Manoskey
(74) Attorney, Agent, or Firm — Armstrong Teasdale LLP

(57) ABSTRACT

A server device is provided for analyzing communication interfaces. The server device includes a processor including a memory configured to store computer-executable instructions. When executed by the processor, the instructions cause the server device to store a plurality of test scenarios from a plurality of sources; receive a plurality of proposed interfaces from the plurality of sources; for each of the plurality of proposed interfaces, execute the plurality of test scenarios using the corresponding proposed interface of the plurality of proposed interfaces; score the plurality of proposed interfaces based on the execution of the plurality of test scenarios for the corresponding interface; and provide the plurality of scores for the plurality of proposed interfaces to the plurality of sources.

20 Claims, 12 Drawing Sheets

SYSTEMS AND METHODS FOR ADVANCED COMMUNICATION INTERFACE ANALYSIS

CROSS REFERENCE TO RELATED APPLICATIONS

This application claims priority to U.S. Provisional Application Ser. No. 63/237,597, filed Aug. 27, 2021, and to U.S. Provisional Application Ser. No. 63/255,427, filed Oct. 13, 2021, and further to U.S. Provisional Application Ser. No. 63/291,259, filed Dec. 17, 2021, which are hereby incorporated by reference in their entirety.

BACKGROUND

The field of the invention relates generally to communication system interfaces, and more particularly, to systems and methods for using Machine Learning to design and/or adjust communication protocols and/or interfaces.

The design for interfaces in communication systems can be difficult in some settings. The communication system interfaces may be inefficiently designed by large groups of self-interested parties. More specifically, in settings where multiple different individuals and/or interests are represented and included in the design process, the process can be very slow and expensive. Furthermore, these inefficient approaches can be bogged down and diverted by the self-interest of parties, especially when intellectual property, such as that associated with patents is involved. In addition, the final design may not be the most efficient or even most effective design for the communication interface. In some situations, the final communication interface does not provide all of the necessary features.

Furthermore, as more cybersecurity concerns are taken into account, the requirements for communication interfaces become more complex and it is harder for these large groups to account for all of the potential issues and compromises. Accordingly, a more efficient and results oriented process and system is needed.

BRIEF DESCRIPTION

In one aspect, a server device for analyzing communication interfaces is provided. The server device includes a processor and a memory configured to store computer-executable instructions. When executed by the processor, the instructions cause the server device to store a plurality of test scenarios from a plurality of sources. The instructions also cause the server device to receive a plurality of proposed interfaces from the plurality of sources. For each of the plurality of proposed interfaces, he instructions cause the server device to execute the plurality of test scenarios using the corresponding proposed interface of the plurality of proposed interfaces. The instructions further cause the server device to score the plurality of proposed interfaces based on the execution of the plurality of test scenarios for the corresponding interface. In addition, the instructions further cause the server device to provide the plurality of scores for the plurality of proposed interfaces to the plurality of sources.

In another aspect, a method for analyzing communication interfaces is provided. The method includes storing a plurality of test scenarios from a plurality of sources. The method also includes receiving a plurality of proposed interfaces from the plurality of sources. For each of the plurality of proposed interfaces, the method includes executing the plurality of test scenarios using the corresponding proposed interface of the plurality of proposed interfaces. The method further includes scoring the plurality of proposed interfaces based on the execution of the plurality of test scenarios for the corresponding interface. In addition, the method includes providing the plurality of scores for the plurality of proposed interfaces to the plurality of sources. Furthermore, the method includes receiving an updated proposal from a first source of the plurality of sources. Moreover, the method includes executing the plurality of test scenarios using the updated proposal. In addition, the method also includes scoring the updated proposal based on the execution. In addition, the method further includes comparing the updated proposal to the plurality of proposed interfaces.

BRIEF DESCRIPTION OF THE DRAWINGS

Those of skill in the art will understand that the drawings, described below, are for illustrative purposes only. The drawings are not intended to limit the scope of the present teachings in any way.

Figure 1:
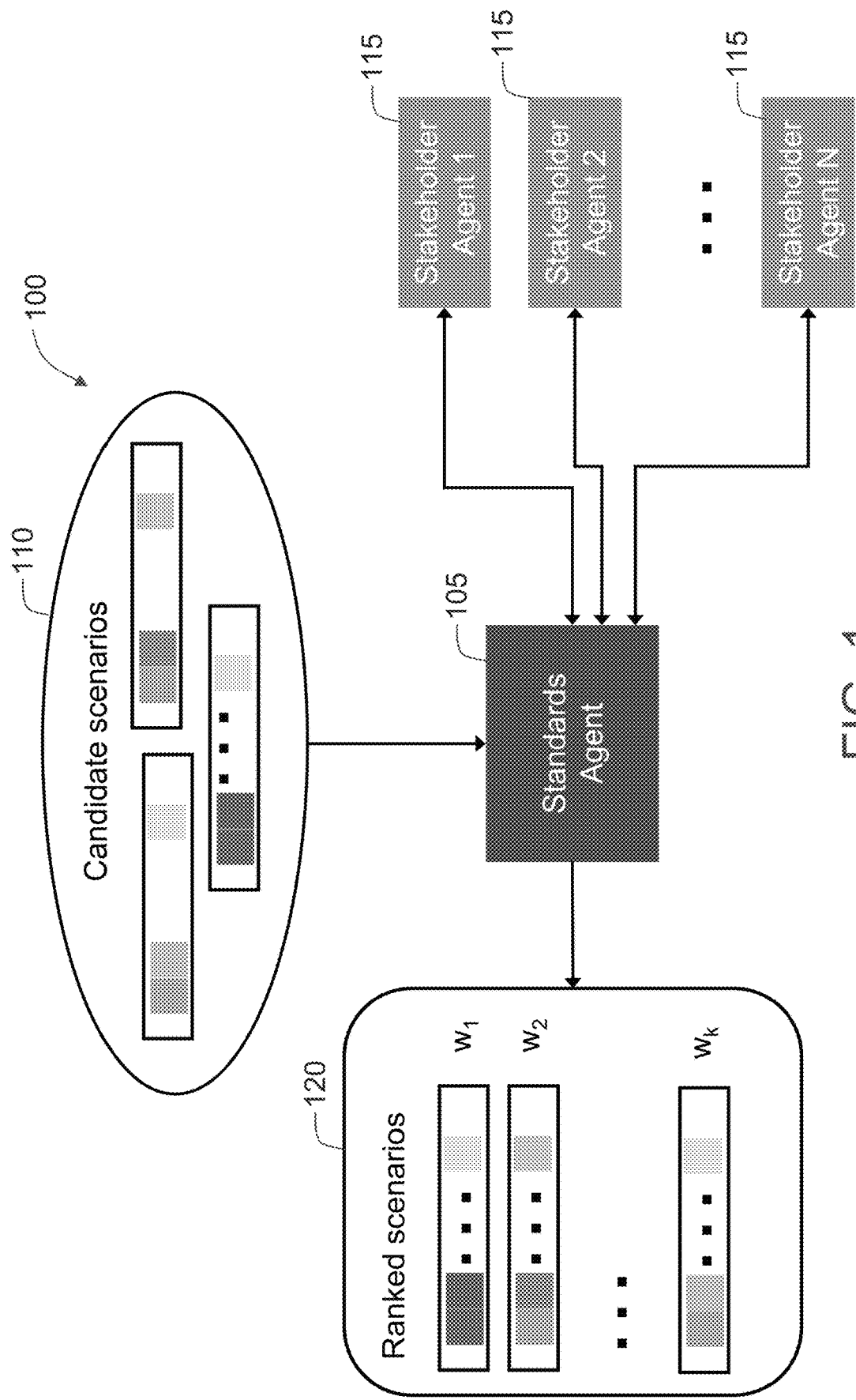
FIG. 1 illustrates a process for ranking scenarios during a pre-evaluation stage of a technical evaluation of communication interfaces in accordance with at least one embodiment.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION

The field of the invention relates generally to communication system interfaces, and more particularly, to systems and methods for using Machine Learning to design and/or adjust communication protocols and/or interfaces.

The creation and ratification of a communication standard is an intricate and political process that is seldom solely guided by technical considerations. Communications standards are designed via committees of humans holding repeated meetings over months or even years until consensus is achieved. This extends even to decisions regarding the modulation and coding schemes to be supported over an air interface. This process consumes extraordinary amounts of person-hours in a seemingly unending stream of meetings where a single company that refuses to ratify a "way forward" consensus draft for a part of the standard can bring the whole standards creation process to a standstill. In many cases, companies are guided by their self-interest, such as to get their own intellectual property into the standard to collect royalties on future products, for example, or for the same reason trying to block a rival company's intellectual property from going into the standard).

The design of interface for a communications standard (such as, but not limited to, the physical layer (PHY)) is usually done by a standards committee, comprising delegates from many member companies, institutions, and organizations. Consensus is achieved on the elements of the design only after repeated meetings stretching over months or even years. Moreover, the committee to decide on the specifics of the interface (such as the PHY layer) is different from the committee to decide on the applications and services to be supported and prioritized by the communications standard. Thus, if a new application or service becomes popular and the communications standards organization wishes to support it, then the interface committee may need to re-initiate their extensive and exhausting meeting schedule in order to finalize the selection of modulation and coding schemes (MCSs) that will allow for this application to be supported at the desired level of performance.

The systems and methods described herein objectivize some elements of this process, in particular the technical aspects related to the creation and evaluation of a draft standard. These systems and methods can be configured to allow companies the freedom to steer the standardization process based on business and economic considerations. However, the systems and methods described herein decouple the technical evaluation of a submitted proposal from the non-technical aspects of the standardization process.

More specifically, the systems and methods described herein optimize the standardization process by automating the technical evaluation of draft standards. The proposed systems and methods also leverage the automated technical evaluation of the submitted proposals to evolve new submissions that are expected to be scored higher at each iteration of the evolutionary mechanism.

Accordingly, the systems and methods described herein decompose and decouple the standards creation process into two processes: a technical evaluation process and a business evaluation process. In particular, a transparent technical evaluation methodology based on criteria, scenarios and requirements agreed upon by all the stakeholders through a secure, privacy-preserving mechanism is described. The technical evaluation process of the proposals is articulated in two stages: the pre-evaluation stage and the evaluation stage.

The goal of the pre-evaluation stage is to select the set of scenarios to be adopted in the subsequent evaluation stage. The process starts with a collection of candidate scenarios submitted by the stakeholders. Reaching a consensus for the pool of candidate scenarios is not required, in that the submitted options will be ranked by all the stakeholders using a secure, privacy-preserving voting mechanism.

For example, the average score of each candidate scenario can calculated across all stakeholders. In this case, the system agent would be the controller and a trusted third-party would be used as the first participant of the score aggregation mechanism. As an option to the trusted third-party solution, multiple independent rounds of the aggregation procedure could be conducted, each with different first participant. Alternatively, a stronger protocol for secure aggregation or a blockchain-based mechanism could also be employed.

In the example embodiment, draft proposals from a plurality of stakeholders are submitted to a Cloud-hosted interface analysis (IA) server controlled by the governing body of the standard. In at least some embodiments, the draft proposals are securely submitted to the IA server using an API. In some of these embodiments, the stakeholder identifying information is removed or hidden before the proposals are shown to the other stakeholders.

The IA server also hosts the evaluator agent (aka the standards agent), which is deployed as a service running on the IA server, with its own API. In some embodiments, the evaluator agent service is provided by the standards governing body. The source code of the evaluator agent is made available to all the stakeholders. This achieves two goals: i) it increases trust in the overall system, in that the evaluation score can be independently double-checked by the companies; ii) it allows companies to refine their draft proposals before the submission. For example, by leveraging the feedback provided by the evaluator, companies could build/improve their draft proposals.

The submitted proposals are evaluated by the standards agent using the scenario(s) selected in the pre-evaluation stage. In case of multiple scenarios, the overall score assigned to each proposal can be computed using different score composition functions: i) the average of the scores obtained in all the evaluations; ii) the weighted average of the evaluation scores, where the weight associated to each score is the score of the corresponding scenario, as determined in the pre-evaluation stage; and iii) a tuple of evaluation scores, one for each considered scenario.

There are multiple options for the evaluation mechanism, including, but not limited to, single-stage, multi-stage, and cross-fertilization multi-stage.

In the single-stage mechanism, the evaluator agent runs each submitted proposal using each selected scenario and determines the corresponding score. The resulting composite score of all the submitted proposals is made available to all the stakeholders.

In the multi-stage case, the single-stage evaluation is repeated in multiple rounds, where at the beginning of each round one or more stakeholders can upload a new draft proposal for evaluation. At the end of each round, the temporary leaderboard based on the scores is made available to all participants. This information can be used by the stakeholders in several ways, including incentivizing two or more companies to merge their draft proposals into one combined submission for the next round.

Finally, the cross-fertilization multi-stage mechanism is an AI-based realization of the multi-stage option. The process starts with an initial (large) population of draft proposals submitted by the different stakeholders. All proposals receive a final score as previously detailed. Methods from the field of genetic algorithms can then be employed to combine high-scoring proposals to create the next generation of proposals that are expected to be scored even higher by the evaluator agent. Alternatively, methods of Operator Learning may be applicable in place of genetic algorithms.

For the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

In these additional embodiments, the MTS may include, without limitation, a termination unit such as an ONT, an OLT, a Network Termination Unit, a Satellite Termination Unit, a Cable MTS (CMTS), or other termination systems collectively referred to herein as "Modem Termination Systems (MTS)". Similarly, the modem described above may include, without limitation, a cable modem (CM), a satellite modem, an Optical Network Unit (ONU), a DSL unit, etc., which are collectively referred to herein as "modems." Furthermore, the DOCSIS protocol may be substituted with, or further include protocols such as EPON, RFOG, GPON, Satellite Internet Protocol, without departing from the scope of the embodiments herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

FIG. 1 illustrates a process 100 for ranking scenarios during a pre-evaluation stage of a technical evaluation of communication interfaces in accordance with at least one embodiment. The goal of the pre-evaluation stage is to select the set of scenarios to be adopted in the subsequent evaluation stage. The process 100 starts with a collection of candidate scenarios 110 by a standards agent 105. The candidate scenarios 110 are submitted to the standards agent 105 by the stakeholders 115. In the exemplary embodiment, the standards agent 105 is executed by the interface analysis (IA) server 1010 (shown in FIG. 10). The standards agent 105 includes an API (application programming interface) that allows the stakeholders 115 to use stakeholder computer devices 1005 (shown in FIG. 10) to provide the candidate scenarios 110. The candidate scenarios 110 describe different situations and/or requirements for the planned communication interface.

For the purposes of the pre-evaluation stage, the process 100 does not need to reach a consensus for the pool of candidate scenarios 110, in that the submitted scenarios 110 will be ranked by all the stakeholders 115 using a secure, privacy-preserving voting mechanism.

For example, the standards agent 105 presents the candidate scenarios 110 to the stakeholders via the stakeholder computer devices 1005. In the exemplary embodiment, the candidate scenarios 110 are anonymized to prevent the stakeholders 115 from knowing which scenario 110 is associated with which stakeholder 115. The stakeholders 115 rate the candidate scenarios 110 and the standards agent 105 collates the ratings. In at least one embodiment, the standards agent 105 calculates the average score of each candidate scenario 110 can calculated across all stakeholders 115.

In at least one embodiment, the standards agent 105 is the controller and a trusted third-party is used as the first participant of the score aggregation mechanism. As an option to the trusted third-party solution, multiple independent rounds of the aggregation procedure could be conducted, each with different first participant. Alternatively, a stronger protocol for secure aggregation or a blockchain-based mechanism could also be employed.

The ranked scenarios 120 are then provided to the evaluation stage. In some embodiments, only a portion of the ranked scenarios 120 are used. In these embodiment, the standards agent 105 only uses a top portion of the ranked scenarios 120. In other embodiments, the standards agent 105 only uses those scenarios 120 that have received a minimum number of votes or percentage of votes from the stakeholders.

Figure 2:
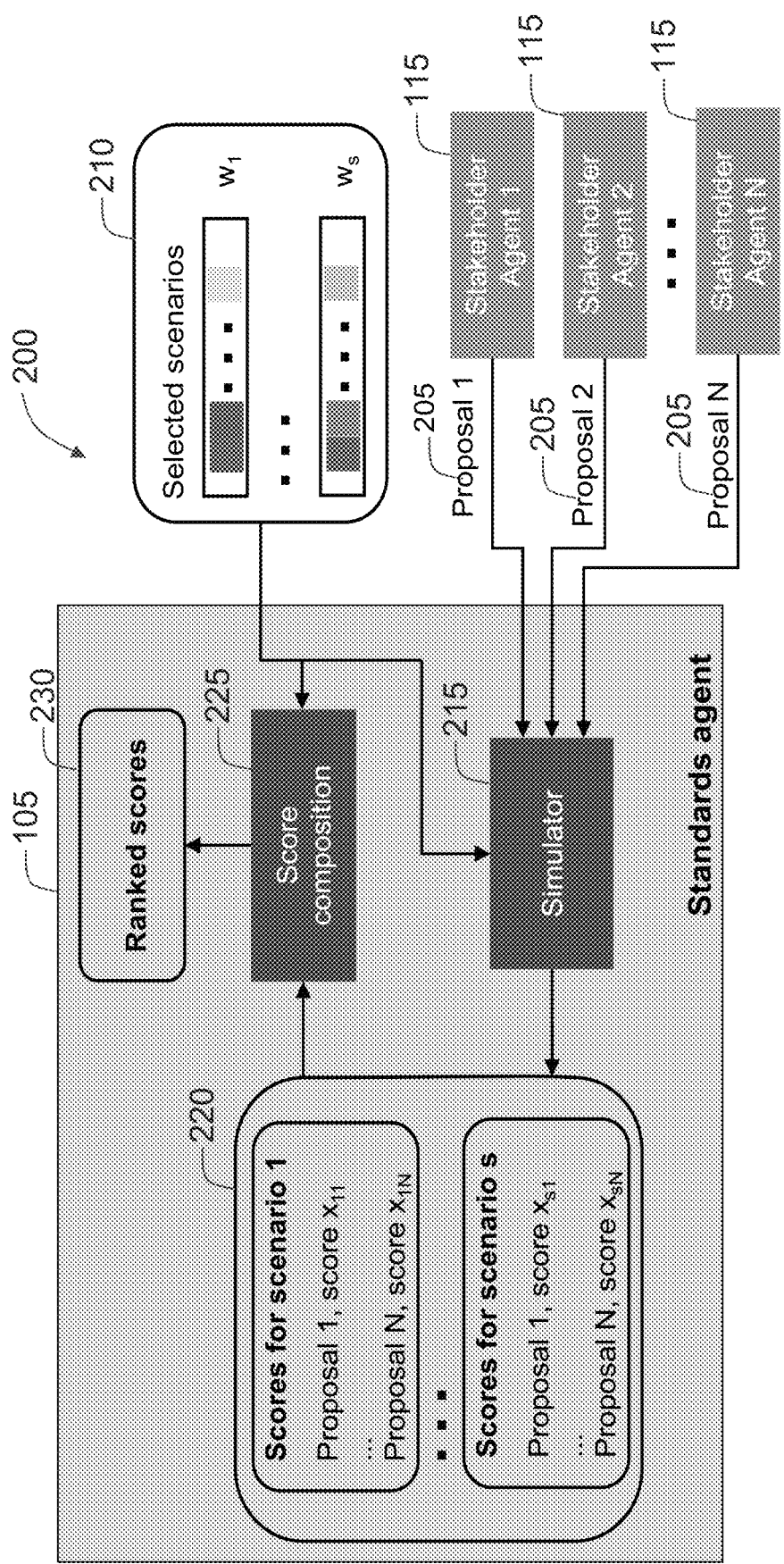
FIG. 2 illustrates a process for evaluating communication interfaces during an evaluation stage of a technical evaluation of communication interfaces in accordance with at least one embodiment.

FIG. 2 illustrates a process 200 for evaluating communication interfaces during an evaluation stage of a technical evaluation of communication interfaces in accordance with at least one embodiment. In the example embodiment, draft proposals 205 from a plurality of stakeholders 115 are submitted to a Cloud-hosted interface analysis (IA) server 1010 (shown in FIG. 10) controlled by the governing body of the standard. In at least some embodiments, the draft proposals 205 are securely submitted to the IA server 1010 using an API. In some of these embodiments, the stakeholder identifying information is removed or hidden before the proposals 205 are shown to the other stakeholders 115.

The proposals 205 include different methodologies for the planned communication interface. In some embodiments, the proposals can include the format for one or more messages in the communication interface. In other embodiments, the proposals can include pin layouts, frame formats, queue behavior, timing, and/or other attributes of the communication interface.

The IA server 1010 hosts the standards agent 105, which is also the evaluator, which is deployed as a service running on the IA server 1010, with its own API. In some embodiments, the evaluator agent service is provided by the standards governing body. The source code of the evaluator agent portion of the standards agent 105 is made available to all the stakeholders 115. This achieves two goals: i) it increases trust in the overall system, in that the evaluation score can be independently double-checked by the stakeholders 115; and ii) it allows the stakeholders 115 to refine their draft proposals 205 before the submission. For example, by leveraging the feedback provided by the evaluator, stakeholders 115 could build/improve their draft proposals 205.

The submitted proposals 205 are evaluated by the standards agent 105 using the scenario(s) 210 selected in the pre-evaluation stage. In case of multiple scenarios 210, the overall score assigned to each proposal 205 can be computed using different score composition functions: i) the average of the scores obtained in all the evaluations; ii) the weighted average of the evaluation scores, where the weight associated to each score is the score of the corresponding scenario 210, as determined in the pre-evaluation stage; and iii) a tuple of evaluation scores, one for each considered scenario 210.

In the exemplary embodiment, the standards agent 105 receives the proposals 205 from the stakeholders 115. The standards agent 105 uses a simulator 215 to run each proposal 205 through the selected scenarios 210. The standards agent 105 determines scores 220 for each proposal 205 for each of the selected scenarios 210. The standards agent 105 uses a score composition component 225 to determine the ranked scores 230 for the proposals 205.

There are multiple options for the evaluation mechanism, including, but not limited to, single-stage, multi-stage, and cross-fertilization multi-stage.

In the single-stage mechanism, the standards agent 105 runs each submitted proposal 205 using each selected scenario 210 and determines the corresponding score 220. The resulting composite score 230 of all the submitted proposals 205 is made available to all the stakeholders 115.

In the multi-stage case, the single-stage evaluation is repeated in multiple rounds, where at the beginning of each round one or more stakeholders 115 can upload a new draft proposal 205 for evaluation. At the end of each round, the temporary leaderboard based on the scores 230 is made available to all stakeholders 115. This information can be used by the stakeholders 115 in several ways, including incentivizing two or more stakeholders 115 to merge their draft proposals 205 into one combined proposal 205 for the next round.

Finally, the cross-fertilization multi-stage mechanism is an AI-based realization of the multi-stage option. The process starts with an initial (large) population of draft proposals 205 submitted by the different stakeholders 115. All proposals 205 receive a final score 230 as previously detailed. Methods from the field of genetic algorithms can then be employed to combine high-scoring proposals 205 to create the next generation of proposals 205 that are expected to be scored even higher by the standards agent 105. Alternatively, methods of Operator Learning may be applicable in place of genetic algorithms.

Figure 3:
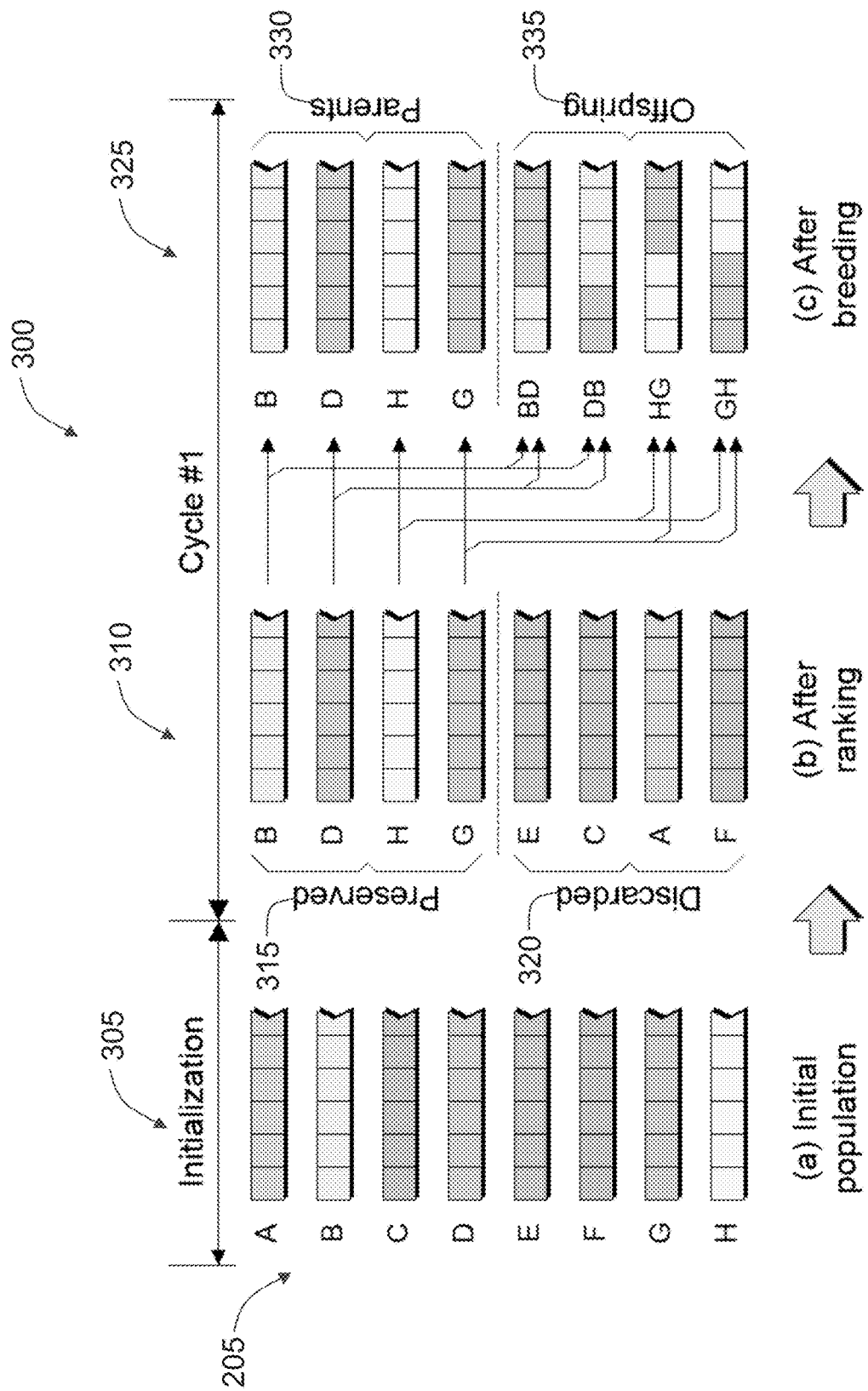
FIG. 3 illustrates a process of performing genetic algorithm crossover using the process shown in FIG. 2.

FIG. 3 illustrates a process 300 of performing genetic algorithm crossover using the process 200 (shown in FIG. 2). In the exemplary embodiment, process 300 is executed by the standards agent 105 (shown in FIG. 1) and the IA server 1010 (shown in FIG. 10).

In the exemplary embodiment, an initial state 305 includes an initial population of proposals 205. The proposals 205 are run through process 200 to receive the ranked scores 230 for the proposals 205. In the post evaluation state 310, the proposals 205 are divided into reserved proposals 315 and discarded proposals 320. Proposals 205 are assigned to the reserved 315 and discarded 320 categories based on their ranked scores 230. In some embodiments, the top ranked half of the proposals 205 are reserved 315 and the rest are discarded 320. In other embodiments, other portions of the proposals 205 can be assigned to the reserved 315 and discarded 320 categories.

In the third state 325, the reserved proposals 315 are used as parents 330 and the standards agent 105 performs one or more genetic algorithms to generate a plurality of offspring proposals 335 which are a mix of portions of the patent proposals 330. The proposals 205 in the third state 325 are then used as inputs into the process 200 for additional ranking.

The ranked scores 230 are used as a fitness feedback from the standards agent 105 to rank the proposals 205 to retain at least a portion of the proposals which scored more highly than other proposals 205. These high scoring proposals are combined with one another like chromosomes to generate new proposals (offspring 335) that have portions (binary substrings) from multiple proposals 205 with high fitness in the original set of proposals (parents 330).

Figure 4:
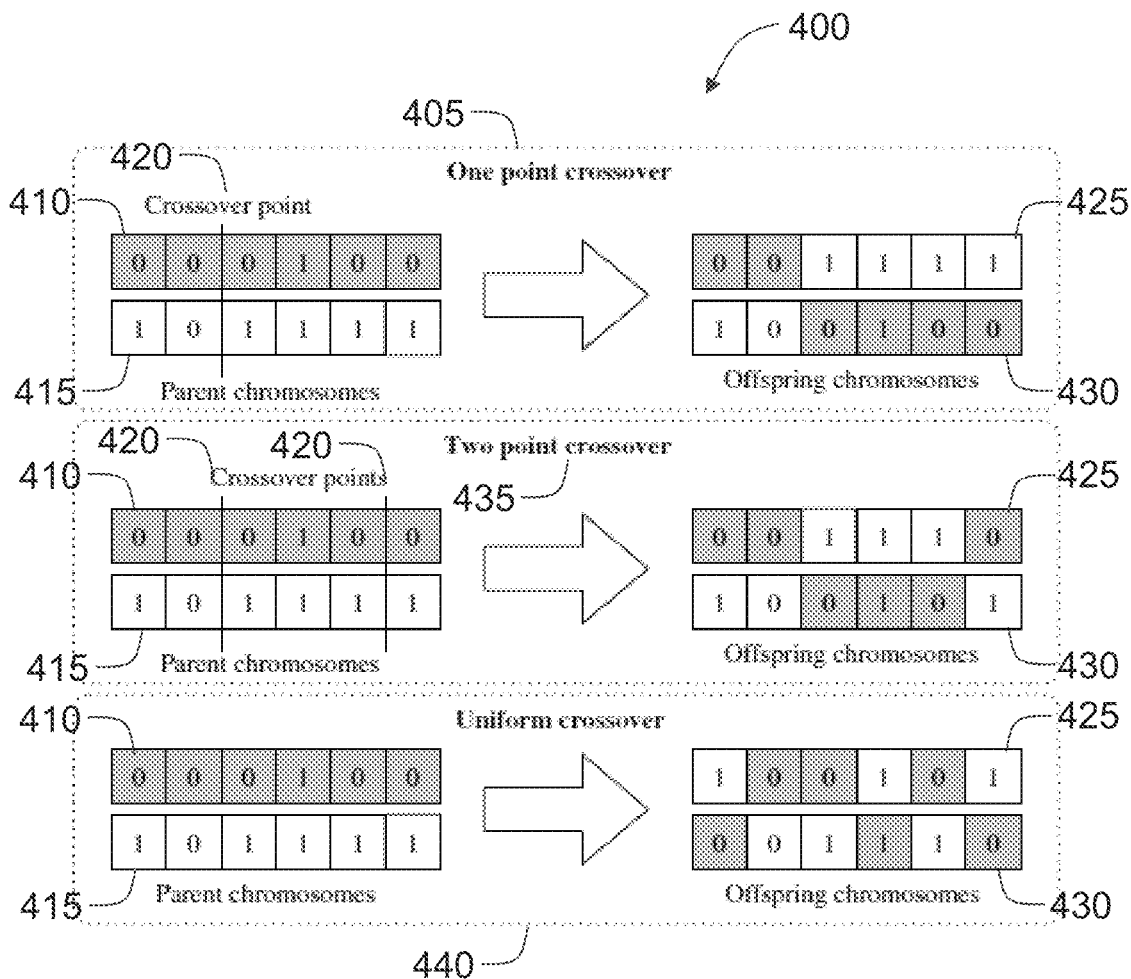
FIG. 4 illustrates multiple processes for performing crossover with genetic algorithm using the process shown in FIG. 2.

FIG. 4 illustrates multiple processes 400 for performing crossover with genetic algorithm using the process 200 (shown in FIG. 2).

Genetic Algorithm composes of three operators: Selection, Crossover, and Mutation. Each operator has its own role to play and is equally important. Process 300 and process 200 shown how proposals 205 (shown in FIG. 2) are selected to be parent proposals 330. The basic crossover operators include, but not limited to, single point, multi-point, and uniform.

In a single-point crossover 405, a crossover point 420 is randomly generated which determines the point for exchange of information between a first parent 410 and a second parent 415 to form a first child 425 and a second child 430. For example, when the crossover point 420 is generated after the second bit, all information from the third bit onwards are exchanged between the two parents 410 and 415 to form children 425 and 430.

In a multi-point crossover 435, multiple crossover points 420 are randomly generated which determines the points for exchange of information between parents 410 and 415 to form children 425 and 430. This results in the exchange of information between the crossover points 420.

To understand this in a simple fashion, consider 2 crossover points 2 & 6. And then perform a single-point crossover at crossover points 2 & 6 sequentially on the parents 410 and 415 to form children 425 and 430. Thus, a multi-point crossover can simply be considered as a single-point crossover executed over multiple different crossover points.

In the uniform crossover 440, information exchange between parents 410 and 415 takes place based on some probability values. A probability matrix with a length the same as the parents 410 and 415 is randomly generated. If the probability value exceeds a predefined threshold at one or more of the bits, information is exchanged at those bits between parents 410 and 415 to form children 425 and 430.

Besides these techniques, there are many several other crossover techniques such as partially mapped crossover (PMX), cycle crossover (CX), order crossover (OX), etc. Any of these techniques may be used with the systems and methods described herein.

Figure 5:
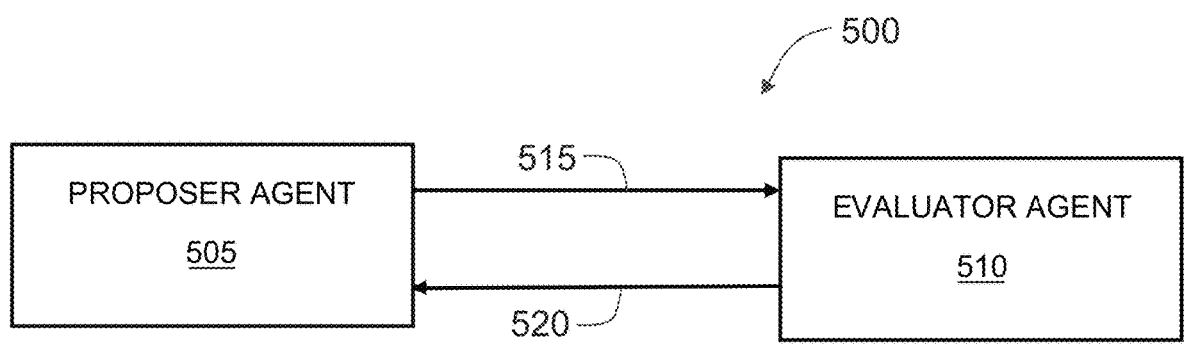
FIG. 5 illustrates a system for using artificial intelligence for designing a communication interface in accordance with at least one embodiment.

FIG. 5 illustrates a system 500 for using artificial intelligence for designing a communication interface in accordance with at least one embodiment.

In the described systems and methods, the standards agent 105 can be driven by machine learning (ML) and/or artificial intelligence (AI). The interface design problem to be solved can be summarized as: an intelligent agent on one side of the interface has a list of minimum performance criteria to be expected from the interface. This agent acts as an evaluator agent 510. On the other side of the interface is another intelligent agent, which acts as the proposer agent 505. An example of such interfaces includes, but is not limited to an A/D converter. However, one having skill in the art would understand that there are very many other such modules.

The proposer agent 505 proposes an interface design 515 to the evaluator agent 510. The evaluator agent 510 evaluates the proposed interface design 515 to see if it satisfies its performance criteria. The evaluator agent 510 gives the proposer feedback 520 regarding each proposed design 515, which lets the proposer agent 505 know whether or not its proposed design 515 exceeds the minimum interface performance requirements. If not, the proposer agent 505 then iterates on its earlier proposal 515 with updates based on the feedback 520 it received from the evaluator agent 510, and re-submits the new proposal 515 to the evaluator agent 510, and so on.

The system 500 accepts the interface when the proposer agent 505 submits a design 515 to the evaluator agent 510 that exceeds the minimum performance requirements required from the interface.

Note that in the above, the evaluator agent 510 and the proposer agent 505 are logical agents. In other embodiments, the two agents 505 and 510 could be embodied in the same piece of software, such as the standards agent 105. However, decoupling the two agents 505 and 510 allows for the evaluator agent 510 to use criteria for evaluation of the proposed interface 515 (including the minimum performance requirements) that are not revealed to the proposer agent 505. Accordingly, the proposer agent 505 sees only the possibly limited feedback 520 it receives from the evaluator agent 510. Therefore, the evaluator agent 510 could, in theory, include non-technical but nevertheless important criteria like intellectual property royalties for the use of certain codecs, etc. in its evaluation of a submitted proposal 515.

In summary, the proposer agent 505 sends proposals 515 in the form of binary bit vectors for the interface to the evaluator agent 510, who returns feedback 520 to the proposer agent 505. This feedback 520 allows the proposer agent 505 to see whether or not its proposed binary vector 515 meets the minimum performance requirements. The proposer agent 505 then uses this feedback 520 to update its proposals 515 and re-submit them to the evaluator agent 510. This may continue until the proposer agent 505 submits a proposal 515 that meets the minimum performance requirements of the interface.

FIG. 5 illustrates a single iteration of the automated interface design algorithm. More specifically, showing a binary vector 515 submitted by the proposer agent 505 to the evaluator agent 510, which responds with feedback 520. The proposer agent 505 uses this feedback 520 to submit a revised binary vector 515 to the evaluator agent 510 in the next iteration. This is repeated until the evaluator's feedback 520 confirms that the proposed binary vector 515 satisfies the minimum performance criteria for the interface. The feedback 520 does not need to be discrete-valued or scalar; however, in many situations the feedback 520 is numerical.

The above iterative procedure requires the following components: (a) an encoding of the interface specification in a format that can be submitted by the proposer agent 505 to the evaluator agent 510, and updated by the proposer agent 505 based on feedback 520 received from the evaluator agent 510; and (b) an algorithm for the proposer agent 505 to update an existing proposal 515 based on feedback 520 from the evaluator agent 510. Moreover it is crucial that this iterative exchange converge swiftly to a solution.

To encode the interface specification, the process 200 uses pre-selected encoding of each proposed interface specification as a binary vector, such as for example, 01010001010101, made up of B (in this case B=14) elements. For example, for a PHY layer interface, the first 4 bits may represent a choice of a modulation scheme, the next 5 bits may represent the choice of the forward error correction code, etc. For each modulation scheme the bits represent an index in a table listing a number of possible modulation schemes that are being considered for the interface design, and similarly for the representation of the codec.

The possibilities for each of these portions of the overall binary vector representing the interface are up to the system designers, but it may be better, at least initially, to eliminate all constraints and allow, say, any constellation for modulation, any codec, etc. in the above example. The evaluator agent 510 can apply criteria that penalize excessive complexity, too-high power consumption, etc. to weed out proposals 515 that are deemed infeasible in some way.

Figure 6A:
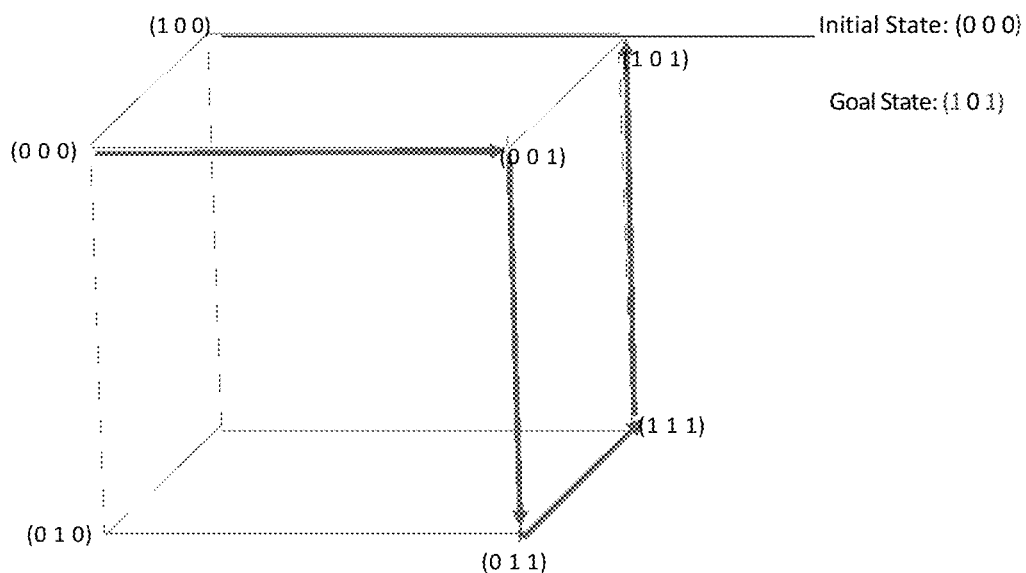
FIGS. 6A and 6B illustrate example of paths for binary vectors.

For illustration purposes, the binary vectors can be embedded in a graph, such as FIG. 6A. FIG. 6A defines a graph in which nodes represent the binary vectors (each being one interface specification) and links denote operators that specify how to move from one node to another. Solving the problem implies finding a path from the initial node to a final node (that satisfies the performance requirements on the interface, as evaluated by the evaluator) by means of available operators.

Each operator is composed of B elements indicating the location of a particular bit in the input vector that should be flipped if it matches the pattern specified by the operator. The operators specify only the bits in the vector that actually change and can be written as "pattern-result" pairs with marks (?) where the operator pattern says nothing about a particular bit position. Formally, an operator is a mapping from the ternary space $\{0,1, ?\}^B$ to itself. For example, suppose B=5. The operator ?1?1 ?-? 0?0? will take the vector 11010 to 10000, or the vector 11111 to 10101, but will not modify the vector 00000 because the bits indicated in the pattern do not match this vector. Equivalently, the operator maps the vector 00000 to itself.

As a result of the "?" bits, operators will vary in their generality. For example, each of the two-element operators such 0?1 ??→1?0 ?? apply to eight different vectors of length B each: 00100, 00101, 00110, 00111, 01100, 01101, 01110, and 01111.

The graph whose nodes are binary vectors of length B is therefore a B-dimensional hypercube whose vertices are the 2B binary vectors of length B. Each edge of this hypercube is a link of the graph corresponding to an operator that "flips" a single bit in a binary vector.

For the interface proposal, the system 500 starts with an arbitrary initial binary vector, say 00000. The proposer agent 505 searches for a binary vector that satisfies the criteria set by the evaluator agent 510 by successively applying operators that change the contents of the binary vector based on feedback 520 received from the evaluator agent 510. In some embodiments, there exists at least one such binary vector that satisfies the minimum performance criteria desired by the evaluator.

The initial and final binary vectors are both nodes on the graph, or equivalently, vertices of the hypercube. The length of the path through the graph required to reach the final node from the initial node is a measure of the performance of the algorithm—the smaller the path length, the quicker the algorithm finds an interface specification that satisfies the minimum performance criteria.

FIG. 6A illustrates an example of such a path for a binary vector of B=3 components. In this example, the paths are restricted through the graph to correspond strictly to edges on the hypercube, i.e., to represent operators that only flip a single bit in a binary vector. An example of a path through the graph (hypercube) of interface specifications, starting from an initial binary vector 000 to a final binary vector 101 that the evaluator agent 510 deems to satisfy the minimum performance criteria for the interface. Note that in this example, the paths are strictly along the edges of the hypercube, i.e., the operators applied at each step of the path are those that flip only a single bit in a binary vector.

The proposer agent 505 learns from the feedback 520 received from the evaluator agent 510 what binary vectors 515 do better than others, and applies this learning to propose better binary vectors 515. This learning problem can be approached in two main methods, Operator Learning and Operator Evolution.

The first approach is Operator Learning where the proposer's learning problem involves two processes that proceed independently of one another. The first process involves the discovery of efficient operators, i.e., operators that can make progress toward a binary vector that satisfies the minimum performance criteria. This is called operator learning.

The next process is the decision problem of selecting which of a collection of operators (which may be assumed to be efficient operators discovered via operator learning from the above process) should be applied at any given node (binary vector) in order to make progress toward a node that satisfies the minimum performance criteria. This can be categorized as a Markov Decision Process problem and may be addressed using the methods from the field of Reinforcement Learning (RL).

Operator learning takes place after an initial set of exploratory trials and can be done using what is called chunking. Basically, the proposer agent 505 can add the operator that most generally summarizes the gains obtained from applying a sequence of different operators in the trial run.

For example, with B=5 and starting with the binary vector 01110 and the proposer agent 505 applies the operators we have at the present time (i.e., only the operators that flip a single bit, as shown for B=3 in FIG. 6A). After several applications of these operators, suppose that the proposer agent 505 finds an improved binary vector (i.e., improved in the sense that the feedback from the evaluator agent 510 says that it is better than the initial binary vector) 10101. The proposer agent 505 summarizes adds to the set of available operators a new operator that takes it from 01110 to 10101 in one step, as 01?10-10?01. This new operator connects two pairs of nodes in the graph, or in other words it adds two directed edges to the hypercube. This is called chunking in the terminology of general problem solving.

Figure 6B:
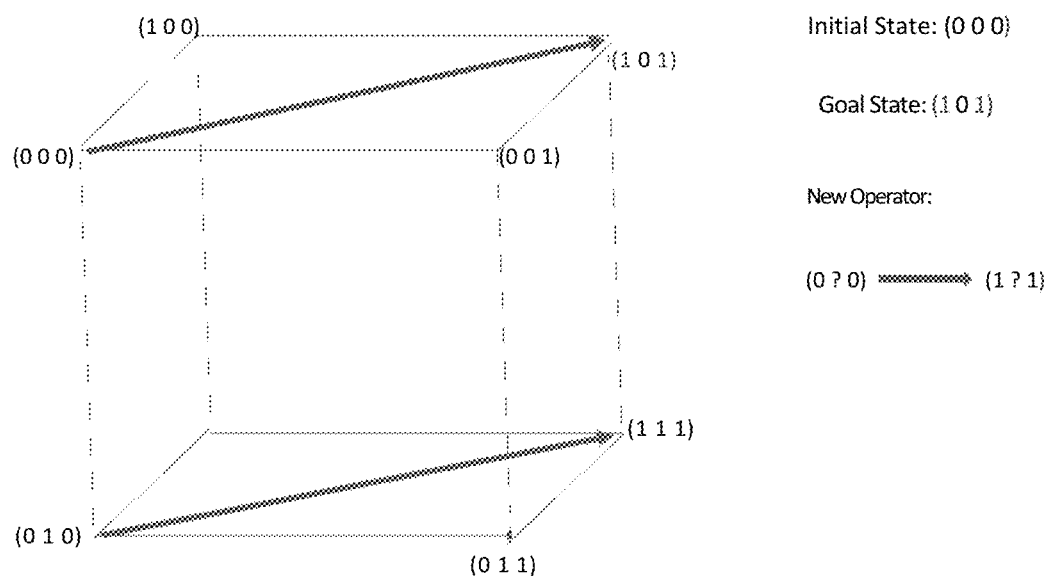

FIG. 6B illustrates an example of such an operator for a vector of B=3 components. Note that unlike in FIG. 6A, where operators were restricted to flip only a single bit in their input binary vector, here the system 500 is allowing chunking, which is equivalent to composition of two or more operators. In the example shown here, the new operator 0?0-1?1 flips two bits at a time and corresponds to a diagonal movement through the hypercube.

An example of a path through the graph (hypercube) of interface specifications, starting from an initial binary vector 000 to a final binary vector 101 that the evaluator deems to satisfy the minimum performance criteria for the interface. Flipping multiple bits yields an operator that allows for diagonal movements in the hypercube.

When there are several applicable operators to a particular state, a decision procedure is required in order to choose among them. Decision procedures can be made more effective by using some kind of utility function, such as any widely-used methods from the field of Reinforcement Learning (RL).

In the RL formulation, the last proposed binary vector defines the state of the system. The environment is the evaluator, and therefore the evaluator's feedback is the reward. Note that for the RL formulation, the reward must be scalar, so if the evaluator's feedback has more than one dimension, then it should be turned into a single scalar quantity in order to qualify as a reward.

Suppose that at the start of step 1, the system is in state $s_t$, the evaluator has returned the reward $r_t$, and the proposer agent 505 now takes the action $a_t$ defined by the operator selected to act on the state (binary vector) $s_t$. Then the submitted proposal by the proposer agent 505 in step t is $a_t(s_t)$. Then at the start of step t+1, the system is in state $s_{t+1}=a_t(s_t)$, the environment (evaluator agent 510) returns the reward $r_{t+1}$ and so on.

Note that the evolution of the states under these actions is a Markov process because the next state depends only upon the present state and the action taken in the present state. The RL approaches to the operator decision problem focus on finding a policy that specifies a rule for selection of an operator $a_t$ when in state $s_t$ so that the overall mean reward is maximized. In other words, the proposer agent 505 seeks to maximize the expected value of $\Sigma_{t=0}^{T-1} r_t$ when selecting actions according to the optimum policy, where T is some maximum number of iterations the proposer agent 505 performs before ending if it is unable to find a binary vector that satisfies the minimum performance criteria set by the evaluator. In some embodiments, the above algorithm converges fairly quickly in a power law fashion.

The second approach to the proposer's learning problem is Operator Evolution. In this approach, the proposer agent 505 avoids the issues involved with both chunking and the operator decision problem, and simply relies on (random) searching using Genetic Algorithms (GA), such as those described in FIGS. 3 and 4. The genetic algorithms employ massive parallelism in the form of mutations (random bit changes) crossover, and selection of the "fittest" vectors.

The proposer agent 505 can user a genetic algorithm for this problem in the following fashion: instead of the proposer agent 505 sending a single binary vector proposal 515 to the evaluator agent 510 for evaluation at each iteration, the proposer agent 505 sends many (hundreds or thousands of) different proposals 515 to the evaluator agent 510 at each iteration. This is equivalent to having hundreds or thousands of proposer-evaluator pairs instead of just one such pair, with each evaluator agent 510 receiving only a single proposed binary vector 515 from the proposer agent 505 that it is paired with. This amounts to the introduction of massive parallelism into this problem.

Each evaluator agent 510 returns its feedback 520 to its paired proposer agent 505, and unlike the reinforcement learning formulation, the evaluator's feedback need not be a scalar value. In the present context of Operator Evolution, the evaluator's (possibly multi-dimensional) feedback 520 for a given binary vector 515 describes the fitness of that binary vector 515.

Once again, given the fitness scores 520 assigned to all the proposed binary vectors 515 from all the proposer agents 505 in the previous iteration, the proposer agents 505 modify and re-submit new proposed vectors 515 in the next iteration. However, the proposer agents 505 do not modify their proposals 515 independently-instead, the entire population of proposer agents 505 modify their proposals 515 together using techniques from the field of GA. For example, the top tenth percentile of proposals 515 (as per their fitness 520) may be combined with each other to create hybrid binary vectors that form the proposals 515 for the next iteration (crossover), and so on. An illustration of what happens in each iteration (also called "cycle") of the GA is given in FIG. 3. The precise way to combine these binary vectors 515 to create new proposals 515 is up to the particular genetic algorithm applied to the problem (see FIG. 4 for a few examples). As before, the algorithm converges when at least one proposal 515 in one iteration has fitness 520 that deems it to satisfy the minimum performance criteria set by the evaluator agent 510.

FIG. 3 illustrates of one iteration or cycle of a GA. For the specific communication interface application, the initial population is the population of binary vectors 515 proposed by the proposer agent 505, and the fitness feedback 520 from the evaluator agent 510 is used to rank these proposed vectors 515 so as to retain only a fraction of these vectors, which scored highly on fitness 520 compared to the other proposed vectors 515. Then, these vectors are combined with one another like chromosomes in biology to generate new binary vectors ("offspring") that have binary substrings from multiple vectors with high fitness in the original set ("parents"). Some examples of how to create such combinations are given in FIG. 4. The parents and offspring together form the new population that is again sent to the evaluator agent 510 for evaluation in the next cycle, and so on.

FIG. 4 includes some examples of ways in which two binary vectors can be combined to create new binary vectors. These examples are inspired by biology, so the original two binary vectors are called "parent chromosomes" whereas the new binary vectors are called "offspring chromosomes." In this example, only two parents and only two offspring are shown, but of course any number of parents could be combined to create any number of offspring. Additionally, the "crossover points" 420 define where a binary substring from one parent is extracted and replaced by the binary substring from the same location in the other parent in order to generate the offspring. For the communication interface, where the first 5 bits of the binary vector represent, say, the modulation scheme and the next 4 bits represent a codec, the crossover points 420 would occur after the fifth and ninth bits respectively, otherwise the generated offspring vector would not be a valid interface specification.

The above procedure for designing a single interface can be applied to an entire stack of interfaces, starting at the topmost interface. At each interface, there are minimum performance criteria that the interface must satisfy. These criteria may simply be inherited from the interface one level above, or could be defined from the criteria for the next higher-level interface.

Another interesting extension of the approach described here can be implemented by generalizing the "interface" to mean any input-to-output block or blocks in a communication system. The genetic algorithm can thus generate a configuration which, while perhaps not optimal, will satisfy the constraints of the individual blocks.

In regard to the design of a forward error correction (FEC) codec, in the context of modern communication systems that have been designed and refined over decades and that operate very close to the information-theoretic limits on performance, it is unlikely that a drop-in replacement for such a module in the existing communication chain will yield any improvement in overall performance. Rather, the strengths of the new approach described herein are that the "interface" can be drawn arbitrarily around any collection of blocks in the current communication chain. For example, the system 500 may design a modulator, FEC, and channel coder all together. It follows that cross-block optimization can be performed to unlock performance improvements other than the purely information-theoretic metrics—e.g., lower power consumption, greater robustness to non-white noise and/or interference, etc.

Figure 7:
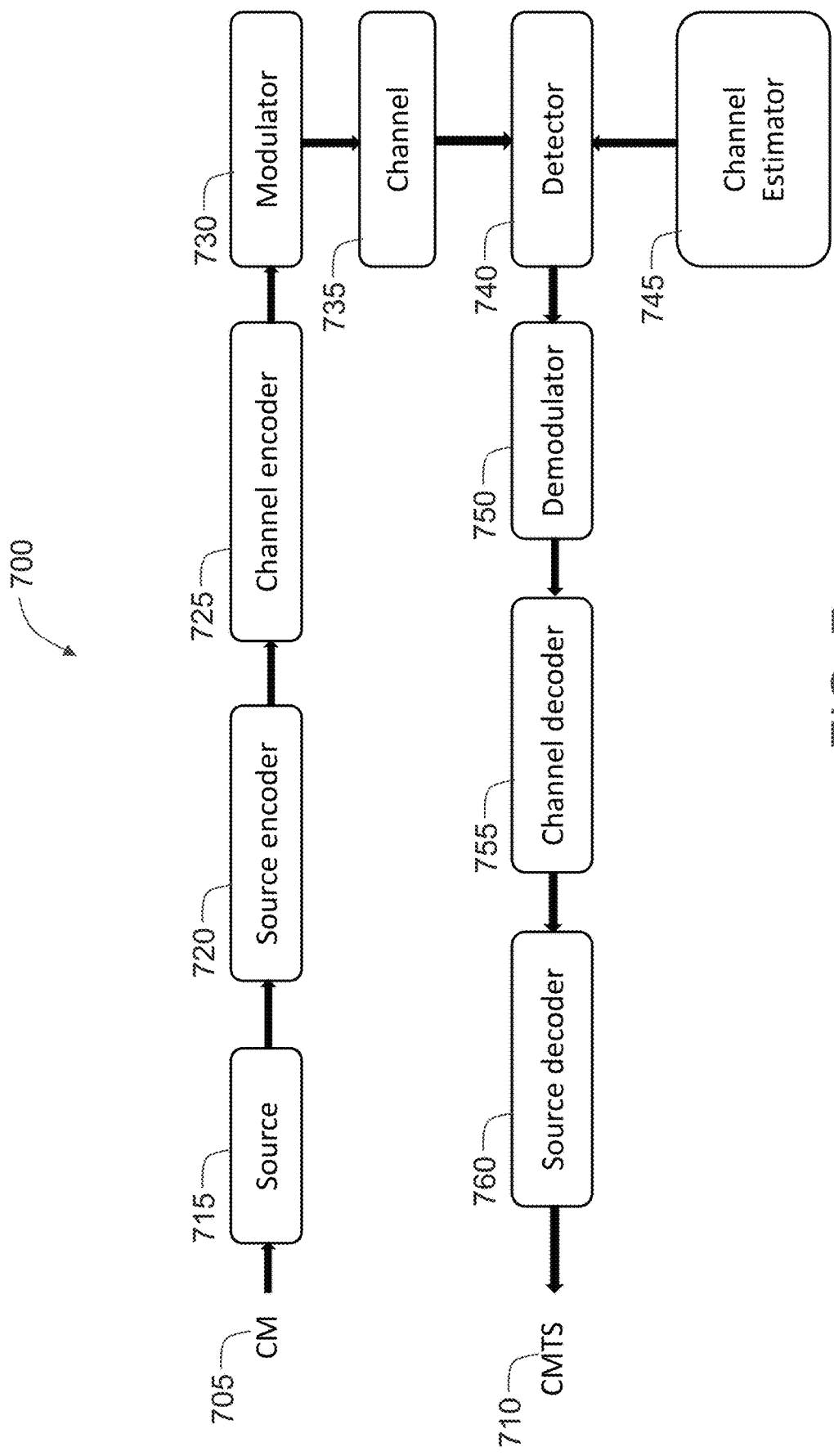
FIG. 7 illustrates a conventional upstream communication chain from a cable modem (CM) to a cable modem termination system (CMTS).

FIG. 7 illustrates a conventional upstream communication chain 700 from a cable modem (CM) 705 to a cable modem termination system (CMTS) 710.

The systems and methods described herein can also be applied to a redesign of the communication chain on an HFC (hybrid fiber-coaxial) link in the form of an end-to-end deep learning model called an "autoencoder." The primary benefit of such a redesign is seen in conditions characterized by severe channel impairments like upstream noise ingress that render the conventional communication chain incapable of performing in the desired operating range as specified by metrics such as throughput or packet loss.

The conventional communication chain on the link between a CM 705 and a CMTS 710 in the present-day HFC plant is composed of multiple functional blocks that are designed in matching pairs (source coder 720/source decoder 760, channel coder 725/channel decoder 755, and modulator 730/demodulator 750), as shown in FIG. 7. Also, the design of the coder/decoder pair today is decoupled from the design of the modulator 730/demodulator 750 pair. Moreover, there are two coder/decoder pairs, one for the source signal 720 and 760, and one for the signal that will be transmitted over the channel 725 and 755, and these coder/decoder pairs are also designed independently of one another.

It is known that a communication chain with this decoupled design is not theoretically optimal in terms of performance (measured by symbol error rate). However, this decoupled design approach is used in the industry today because it allows us to design the communication chain by attacking simpler (and smaller) design problems than the theoretically intractable problem of designing a jointly optimal chain of coder/decoder and modulator/demodulator pairs.

Figure 8:
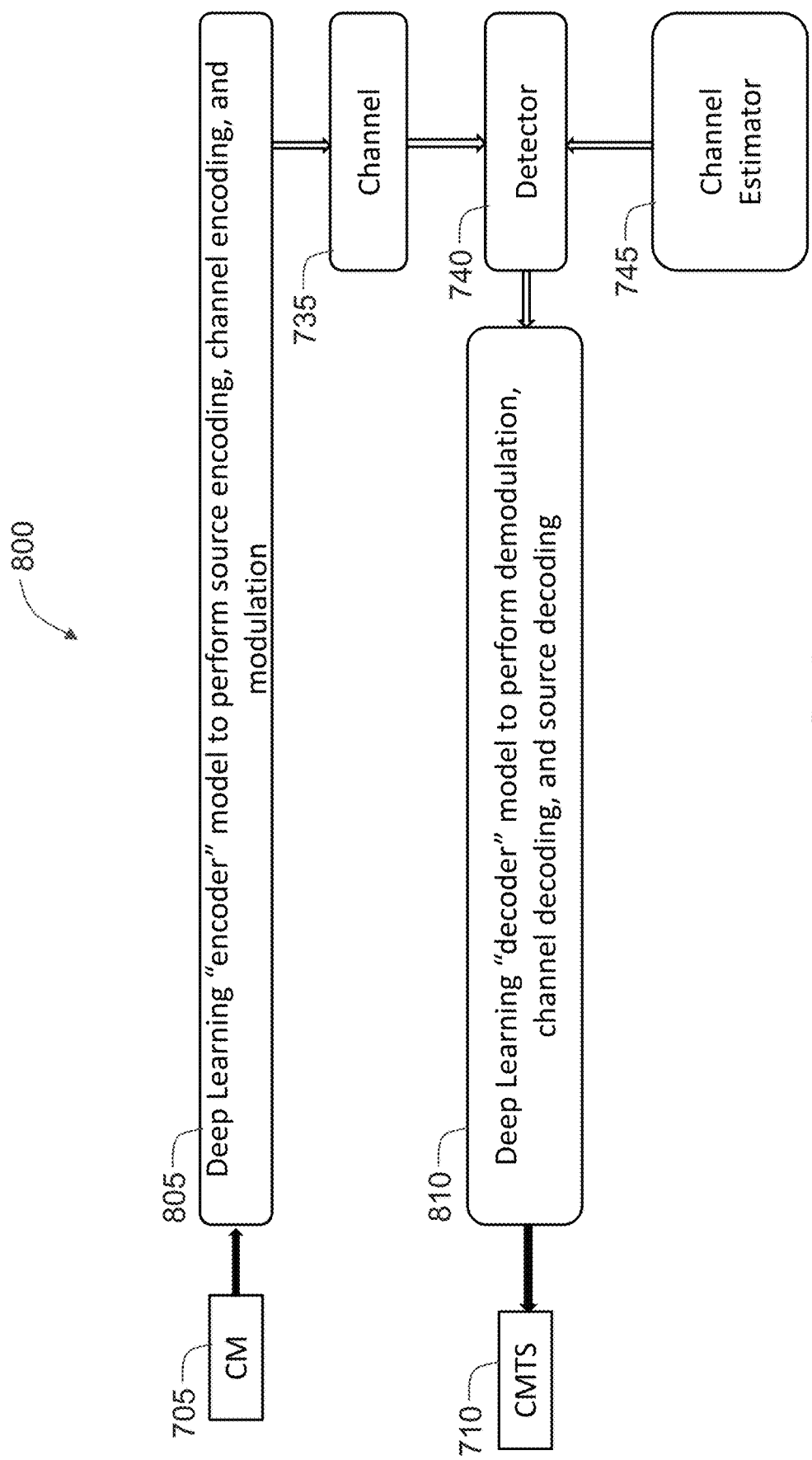
FIG. 8 illustrates an autoencoder communication chain from a cable modem (CM) to a cable modem termination system (CMTS).

The deep learning models can be used to conceive of a communication chain that is: a) Not designed by theoretical principles but trained on real-world training examples; b) Not split up into the functional blocks of FIG. 7 with pairs of blocks designed independently of one another, but instead trained as a single end-to-end model as shown in FIG. 8; and c) Not necessarily theoretically optimal but empirically tested to perform at the state-of-the-art.

FIG. 8 illustrates an autoencoder communication chain 800 from a cable modem (CM) 705 to a cable modem termination system (CMTS) 710. The end-to-end deep learning model shown in FIG. 8 is called an "autoencoder" and comprises an "encoder" 805 (i.e., the functionality of the transmitter part of FIG. 8) and a "decoder" 810 (the functionality of the receiver part of FIG. 8) separated by a "channel" 735 which is required to have a mathematical representation in the form of a differentiable function. The encoder 805 part of a deep learning autoencoder incorporates the functionality of a source 720 and channel encoder 725 in FIG. 7, together with a modulator 730. The decoder 810 part of a deep learning autoencoder incorporates the functionality of a source 760 and channel decoder 755 in FIG. 7, together with a demodulator 750.

Note that the conventional communication chain 700, comprising functional blocks that are independently designed based on theoretical principles, yields a linear system that implicitly assumes that the channel 725 is also linear for optimal performance. This is because there are very few theoretical results or principles for the design of nonlinear communication chains, or communication chains that can operate in highly nonlinear conditions (with some exceptions, like techniques of amplifier predistortion).

On the other hand, the deep learning autoencoder communication chain 800 is an inherently nonlinear system that is trained on real-world data instead of being designed based on theoretical principles. Thus, the autoencoder model is not constrained at all to perform well only in linear conditions. Instead, it can easily tackle abnormal operating conditions characterized by nonlinearities in the channel or noise, for example, such as upstream noise ingress.

The HFC plant has the unfortunate property of collecting and amplifying (on the upstream) any noise ingress into the RF (radio frequency) spectrum in the coax from sundry sources like improperly installed lightbulbs and household appliances, loose connections to taps, or cracked drop cables. Not only does this cause issues for customers upstream of the point of noise ingress, but also it makes fixing the problem time-consuming and expensive for the cable operator as it requires a technician (or two) in a van to go painstakingly from home to home, and tap to tap, in order to identify the source of the injected upstream noise.

The harmful effect of upstream noise ingress on the conventional communication chain 700 is well-documented and well-known to operators and service technicians, as is the practical and logistical difficulty of finding the source of the noise ingress in an HFC plant.

A solution that makes the communication chain between CM 705 and CMTS 710 robust to these channel impairments would improve customer satisfaction and reduce operator operating expenses all at the same time. Not only would the communication chain continue to provide good performance under noise ingress, but also the affected end-user(s) would not even be aware of the issue as they would not experience slowdowns or unstable connections. Instead, routine measurements made by the cable operator, or routine maintenance scheduled by the operator, could detect underlying noise ingress, and the problem could be fixed on a timeline determined by the convenience of the operator instead of being forced on the operator due to end-user complaints, as happens today.

The autoencoder communication chain 800 is a solution that is robust to upstream noise ingress. The autoencoder communication chain 800 can be used as an end-to-end machine learning (ML) based implementation of the entire communication chain between CMTS 710 and CM 705.

The overall architecture of the communication chain is the so-called "autoencoder", comprising an "encoder" 805 and a "decoder" 810 separated by a "channel" 735 represented by a differentiable mathematical function. The transmitter blocks (source encoder 720, channel encoder 725, and modulator 730) are jointly optimized and implemented via a deep learning network that forms the "encoder" 805 of the autoencoder. The receiver blocks (demodulator 750, channel decoder 755, and source decoder 760) are also jointly optimized and implemented via another deep learning network that forms the "decoder" 810 of the autoencoder.

The end-to-end deep learning autoencoder network formed from the above encoder 805 and decoder 810 is capable of robustly selecting channel impairments (including upstream noise ingress from customer homes) that cannot be handled by the conventional communication chain 700. As a result, such impairments require a truck roll with time-consuming home-by-home hunting for the source of the upstream noise.

The above architecture with its designed robustness against such channel impairments and noise ingress will dramatically reduce the need for time-consuming and resource-intensive truck rolls, thereby yielding operating expenses savings and an increase in consumer satisfaction (as the end-user will not even be aware of the issue).

The encoder 805 and decoder 810 of the autoencoder are implemented by separate deep learning networks. These networks are non-recurrent, meaning that they are feed-forward neural networks. They could be either convolutional neural networks (CNNs) or fully connected networks (FCNs, also called multi-layer perceptrons, or MLPs). CNN architectures are the state-of-the-art for computer vision applications, but for the communication chain autoencoder model there is no compelling reason to use a CNN. Therefore, in some embodiments, the system instead uses modestly sized FCN architectures for both the encoder 805 and the decoder parts 810 of the autoencoder.

The output of the encoder 805 should yield both the in-phase and quadrature components of the waveform to be transmitted over the channel 735. Similarly, the input to the decoder 810 should comprise the in-phase and quadrature components of the waveform as received over the channel 735.

As stated above, the channel 735 has a mathematical representation as a differentiable function in order for the end-to-end autoencoder model (including the channel) to be trainable using gradient-descent methods based on backpropagation, which is the basis of nearly all deep learning training algorithms today.

The autoencoder (i.e., encoder 805-channel 735-decoder chain 810) is trained as a single deep learning model on a set of training examples, such as a symbol from the CM 705 that needs to be encoded, passed through the channel, and decoded to be output to the CMTS.

However, as a practical matter, the training of autoencoders is made considerably easier if the output of the encoder is constrained in some way, and separately train the encoder and decoder networks while requiring that the target of the decoder 810 should be the input to the encoder 805. This can be accomplished in a real-world system by measuring the actual output of the conventional transmitter chain 700 and using it as the target output of the encoder network for training purposes.

By using training examples representing normal operating conditions, it may be possible to dispense with real-world measurements and just simulate the training data according to theoretical models of the source and channel coders, modulator, and noise. However, to provide robustness against abnormal operating conditions represented by upstream noise ingress, for such training examples should take measurements on a real-world HFC plant that is suffering from such noise ingress.

The training can be similar to the training for the communication interface described in FIG. 5. Accordingly, the interface can be drawn arbitrarily around any collection of blocks in the current communication chain. For example, the system 500 may be used to design a modulator, FEC, and channel coder all together. Furthermore, the system 500 can be used to perform cross-block optimization to unlock performance improvements other than the purely information-theoretic metrics—e.g., lower power consumption, greater robustness to non-white noise and/or interference, etc.

The systems and methods described herein use Reinforcement Learning (RL) and Genetic Algorithms (GA) to design an "interface," which could involve the combined chain of functional blocks of the transmitter side of the conventional communication chain in FIG. 7. One having skill in the art would understand that the encoder 805 and/or decoder 810 could be trained via RL, GA, and/or conventional supervised learning methods employed to train deep learning models, i.e., some form of gradient descent based on backpropagation.

Figure 9:
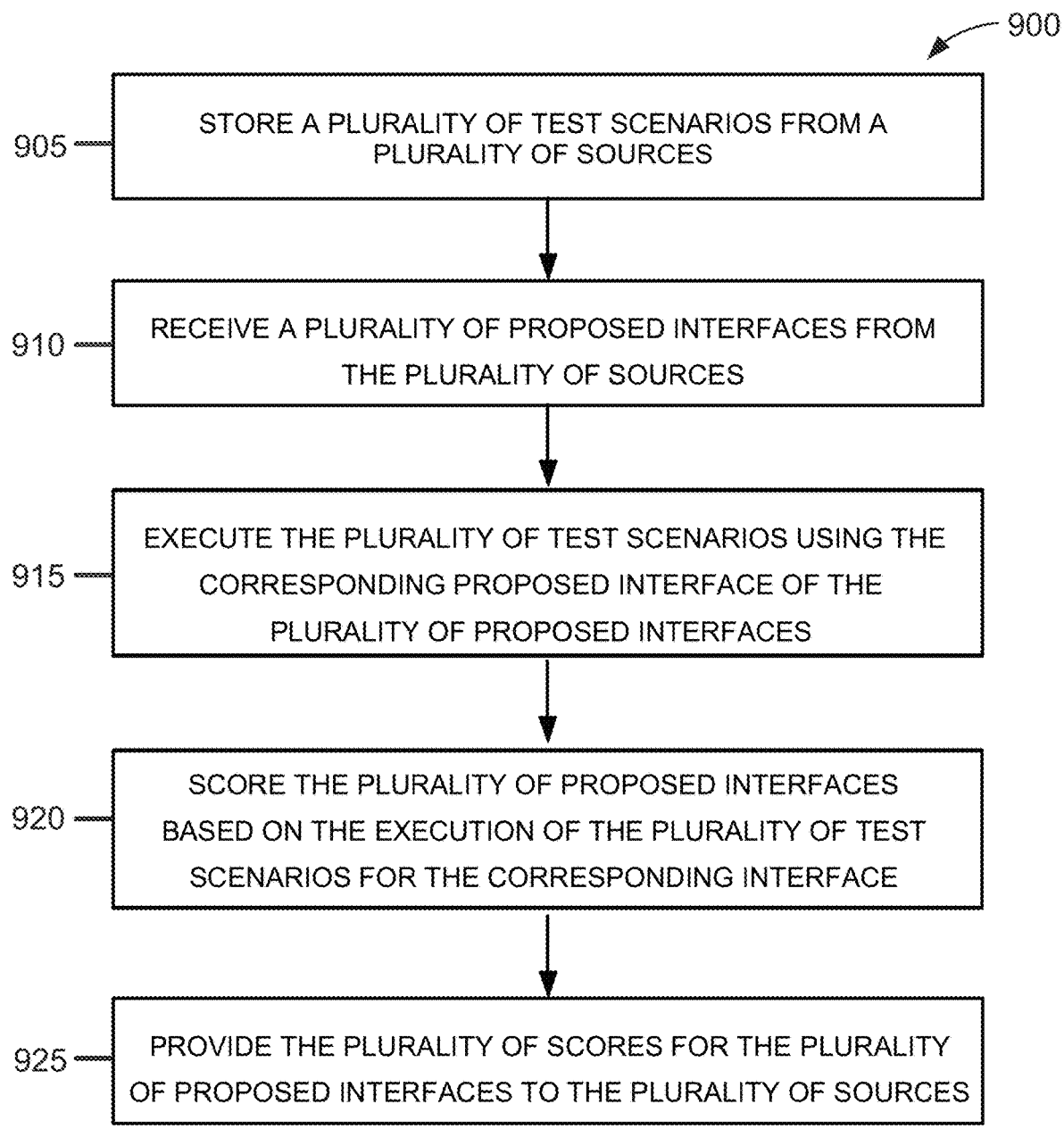
FIG. 9 illustrates a process for analyzing communication interfaces using the system shown in FIG. 10.
Figure 10:
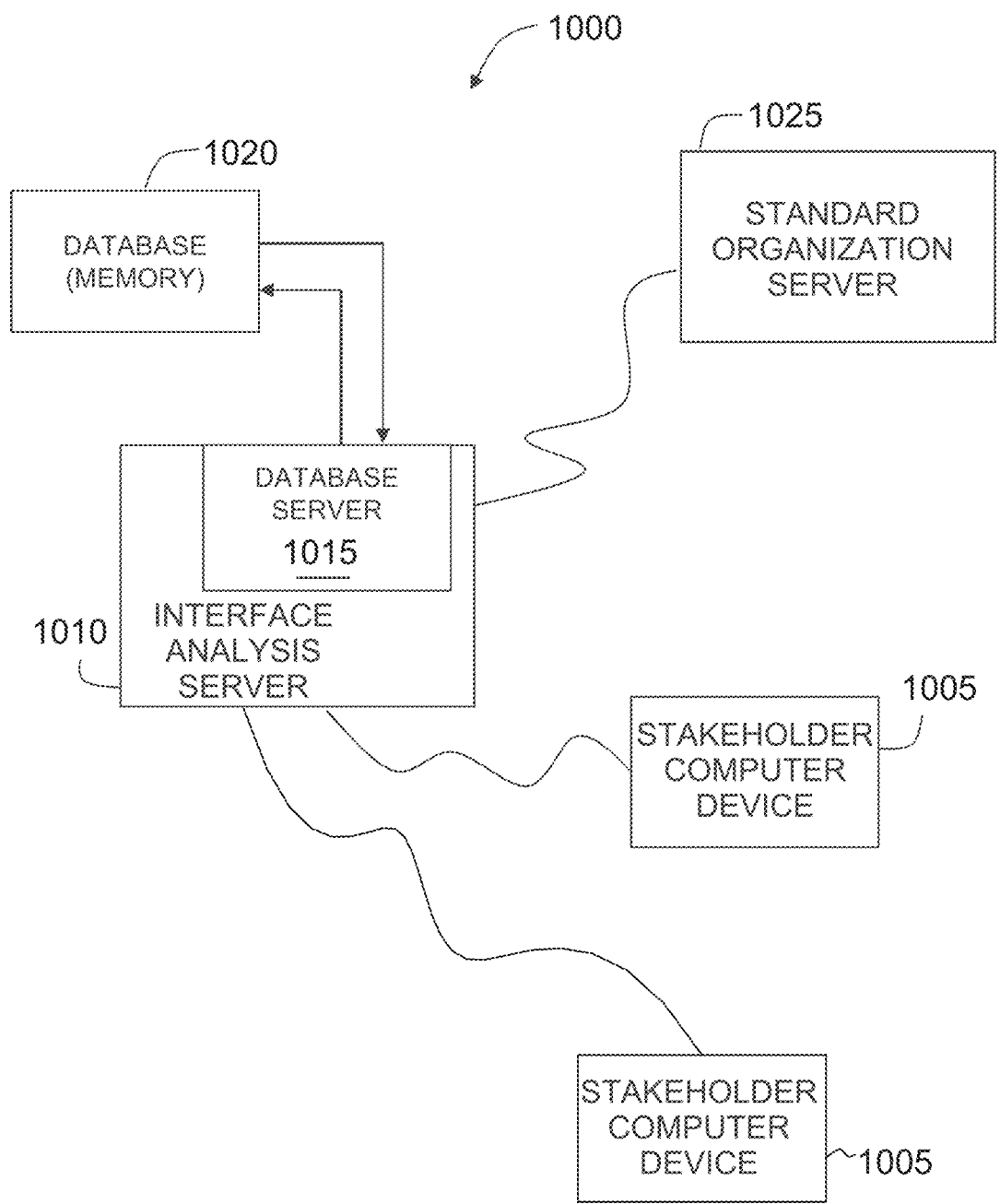
FIG. 10 depicts a simplified block diagram of an exemplary computer system for implementing the processes shown in FIGS. 1-4 and 9.

FIG. 9 illustrates a process 900 for analyzing communication interfaces using the system 1000 (shown in FIG. 10). In the exemplary embodiment, process 900 is implemented using the IA server 1010 (shown in FIG. 10) in communication with a plurality of stakeholder computer devices 1005 (shown in FIG. 10).

In the exemplary embodiment, the IA server 1010 stores 905 a plurality of test scenarios 110 from a plurality of sources 115 (both shown in FIG. 1. In at least one embodiment, the plurality of test scenarios are the selected scenarios 210 (shown in FIG. 2). The plurality of sources 1005 are a plurality of computer devices 1005 associated with a plurality of stakeholders 115 in the design of the communication interface. A first scenario 210 of the plurality of scenarios 210 is submitted by a standard setting organization.

In some embodiments, the IA server 1010 receives the plurality of scenarios 110 from the plurality of sources 115. The IA server 1010 transmits the plurality of scenarios 110 to each of the plurality of sources 115. The IA server 1010 receives votes for the plurality of scenarios 110 from the plurality of sources 115. The IA server 1010 ranks the plurality of scenarios 110 based on the plurality of votes. The IA server 1010 filters the plurality of scenarios 110 based on the rankings to remove a subset of the plurality of scenarios 110. The IA server 1010 executes the remaining plurality of scenarios 210 using the plurality of interface proposals 205.

In the exemplary embodiment, the IA server 1010 receives 910 a plurality of proposed interfaces 205 (shown in FIG. 2) from the plurality of sources 115. For each of the plurality of proposed interfaces 205, the IA server 1010 executes 915 the plurality of test scenarios 210 using the corresponding proposed interface 205 of the plurality of proposed interfaces 205. The IA server 1010 scores 920 the plurality of proposed interfaces 205 based on the execution of the plurality of test scenarios 210 for the corresponding interface. The IA server 1010 provides 925 the plurality of scores 230 (shown in FIG. 2) for the plurality of proposed interfaces 205 to the plurality of sources 115.

The IA server 1010 receives an updated proposal 205 from a first source 115 of the plurality of sources 115. The IA server 1010 executes the plurality of test scenarios 210 using the updated proposal 205. Then the IA server 1010 scores the updated proposal 205 based on the execution. The IA server 1010 compares the updated proposal 205 to the plurality of proposed interfaces 205.

In some embodiments, the IA server 1010 ranks the plurality of proposed interfaces 205 based on the plurality of scores 230. The IA server 1010 discards a portion 320 (shown in FIG. 3) of the plurality of proposed interfaces 205 based on the ranking. The IA server 1010 generates one or more updated interface proposals 335 based on the remaining portion 330 (both shown in FIG. 3) of the plurality of proposed interfaces 205. The one or more updated interface proposals 335 are generated using genetic algorithms. The one or more updated interface proposals 335 can be generated using pre-determined crossover points 420 (shown in FIG. 1). The predetermined crossover points 420 may be based on attributes of the communication interface.

In some embodiments, the communication interface is for a cable modem (CM) 705, where the communication interface combines at least one encoder 720 and 725 and a modulator 730 (all shown in FIG. 7). In other embodiments, the communication interface is for a cable modem termination system (CMTS) 710, wherein the communication interface combines at least one decoder 755 and 760 and a demodulator 750 (all shown in FIG. 7).

In some embodiments, the IA server 1010 generates a model based on the plurality of scenarios. The IA server 1010 executes the model to simulate operation of the communication interface.

In additional embodiments, the IA server 1010 executes a plurality of rounds of analysis, wherein the plurality of scenarios 210 are executed with a current set of interface proposals 205 in each round of the plurality of rounds of analysis.

FIG. 10 depicts a simplified block diagram of an exemplary computer system 1000 for implementing processes 100, 200, 300, 400, and 900 shown in FIGS. 1-4 and 9. In the exemplary embodiment, system 1000 may be used for analyzing communication interfaces. As described below in more detail, an interface analysis ("IA") server 1010 may be configured to store a plurality of test scenarios from a plurality of sources; receive a plurality of proposed interfaces from the plurality of sources; for each of the plurality of proposed interfaces, execute the plurality of test scenarios using the corresponding proposed interface of the plurality of proposed interfaces; score the plurality of proposed interfaces based on the execution of the plurality of test scenarios for the corresponding interface; and provide the plurality of scores for the plurality of proposed interfaces to the plurality of sources.

In the exemplary embodiment, stakeholder computer devices 1005 are computers that include a web browser or a software application, which enables stakeholder computer devices 1005 to access IA server 1010 using the Internet. More specifically, stakeholder computer devices 1005 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Stakeholder computer devices 1005 may be any device capable of accessing the Internet including, but not limited to, a mobile device, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), chat bots, or other web-based connectable equipment or mobile devices.

A database server 1015 may be communicatively coupled to a database 1020 that stores data. In one embodiment, database 1020 may include proposals 205, scenarios 210 (both shown in FIG. 2), vectors 515, feedback 520 (both shown in FIG. 5), and/or user preferences. In the exemplary embodiment, database 1020 may be stored remotely from IA server 1010. In some embodiments, database 1020 may be decentralized. In the exemplary embodiment, a person may access database 1020 via stakeholder computer devices 1005 or standard organization server 1025 by logging onto IA server 1010, as described herein.

IA server 1010 may be communicatively coupled with one or more the stakeholder computer devices 1005. In some embodiments, IA server 1010 may be associated with, or is part of a computer network associated with a standards organization, or in communication with the standards organization's computer network (not shown). In other embodiments, IA server 1010 may be associated with a third party and is merely in communication with the standards organization's computer network.

One or more standards organization servers 1025 may be communicatively coupled with IA server 1010 via the Internet or a local network. More specifically, standards organization servers 1025 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Standards organization servers 1025 may be any device capable of accessing the Internet including, but not limited to, a mobile device, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), chat bots, or other web-based connectable equipment or mobile devices.

Figure 11:
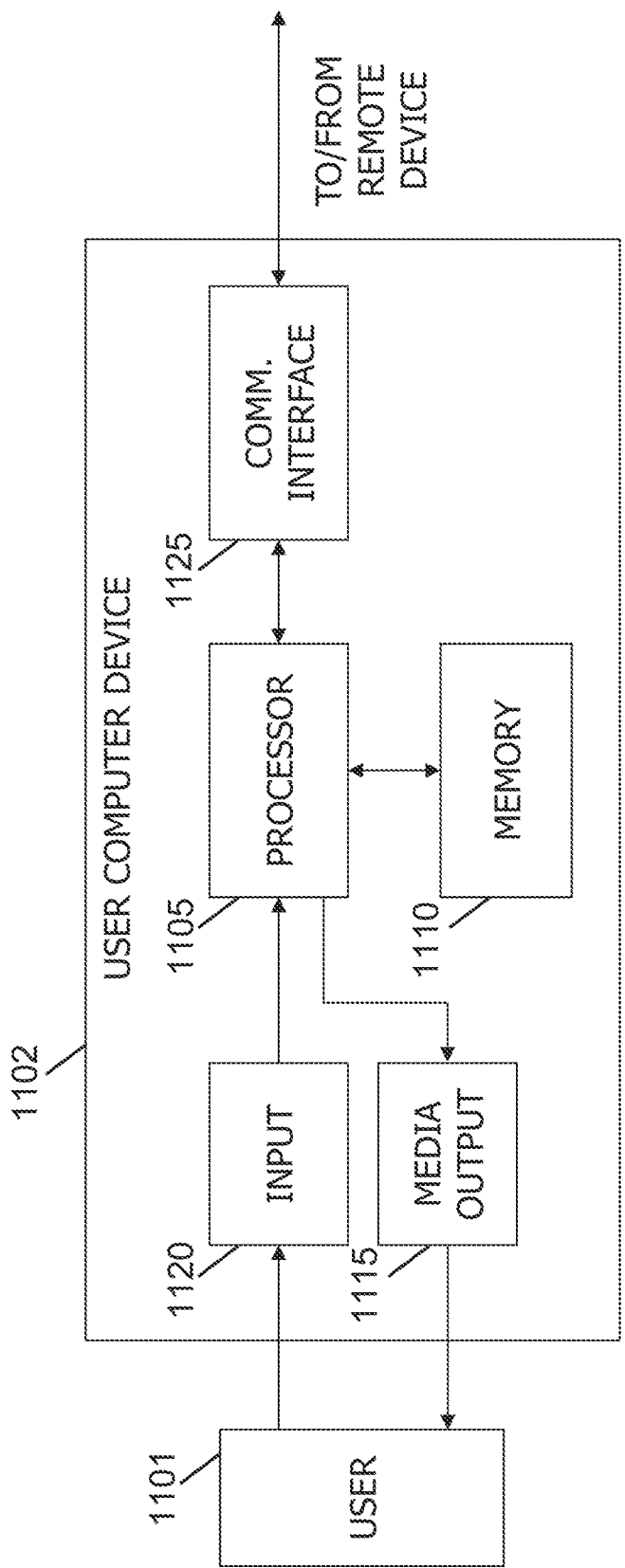
FIG. 11 depicts an exemplary configuration of client computer devices, in accordance with one embodiment of the present disclosure.

FIG. 11 depicts an exemplary configuration of client computer devices, in accordance with one embodiment of the present disclosure. User computer device 1102 may be operated by a user 1101. User computer device 1102 may include, but is not limited to, standards agent 105 (shown in FIG. 1), simulator 215, score composition 225 (both shown in FIG. 2), proposer agent 505, evaluator agent 510 (both shown in FIG. 5), CM 705, CMTS 710 (both shown in FIG. 7), and stakeholder computer device 1005 (shown in FIG. 10).

User computer device 1102 may include a processor 1105 for executing instructions. In some embodiments, executable instructions are stored in a memory area 1110. Processor 1105 may include one or more processing units (e.g., in a multi-core configuration). Memory area 1110 may be any device allowing information such as executable instructions and/or transaction data to be stored and retrieved. Memory area 1110 may include one or more computer readable media.

User computer device 1102 may also include at least one media output component 1115 for presenting information to user 1101. Media output component 1115 may be any component capable of conveying information to user 1101. In some embodiments, media output component 1115 may include an output adapter (not shown) such as a video adapter and/or an audio adapter. An output adapter may be operatively coupled to processor 1105 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 1115 may be configured to present a graphical user interface (e.g., a web browser and/or a client application) to user 1101. A graphical user interface may include, for example, scores 230 from a plurality of proposals 205 (both shown in FIG. 2). In some embodiments, user computer device 1102 may include an input device 1120 for receiving input from user 1101. User 1101 may use input device 1120 to, without limitation, select and/or enter one or more policies.

Input device 1120 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 1115 and input device 1120.

User computer device 1102 may also include a communication interface 1125, communicatively coupled to a remote device such as IA server 1010 (shown in FIG. 10). Communication interface 1125 may include, for example, a wired or wireless network adapter and/or a wireless data transceiver for use with a mobile telecommunications network.

Stored in memory area 1110 are, for example, computer readable instructions for providing a user interface to user 1101 via media output component 1115 and, optionally, receiving and processing input from input device 1120. A user interface may include, among other possibilities, a web browser and/or a client application. Web browsers enable users, such as user 1101, to display and interact with media and other information typically embedded on a web page or a website from IA server 1010. A client application allows user 1101 to interact with, for example, proposals 205 and scores 230. For example, instructions may be stored by a cloud service, and the output of the execution of the instructions sent to the media output component 1115.

Processor 1105 executes computer-executable instructions for implementing aspects of the disclosure. In some embodiments, the processor 1105 is transformed into a special purpose microprocessor by executing computer-executable instructions or by otherwise being programmed. For example, the processor 1105 may be programmed with the instructions such as processes 100, 200, 300, 400, and 900 (shown in FIGS. 1-4 and 9, respectively).

Figure 12:
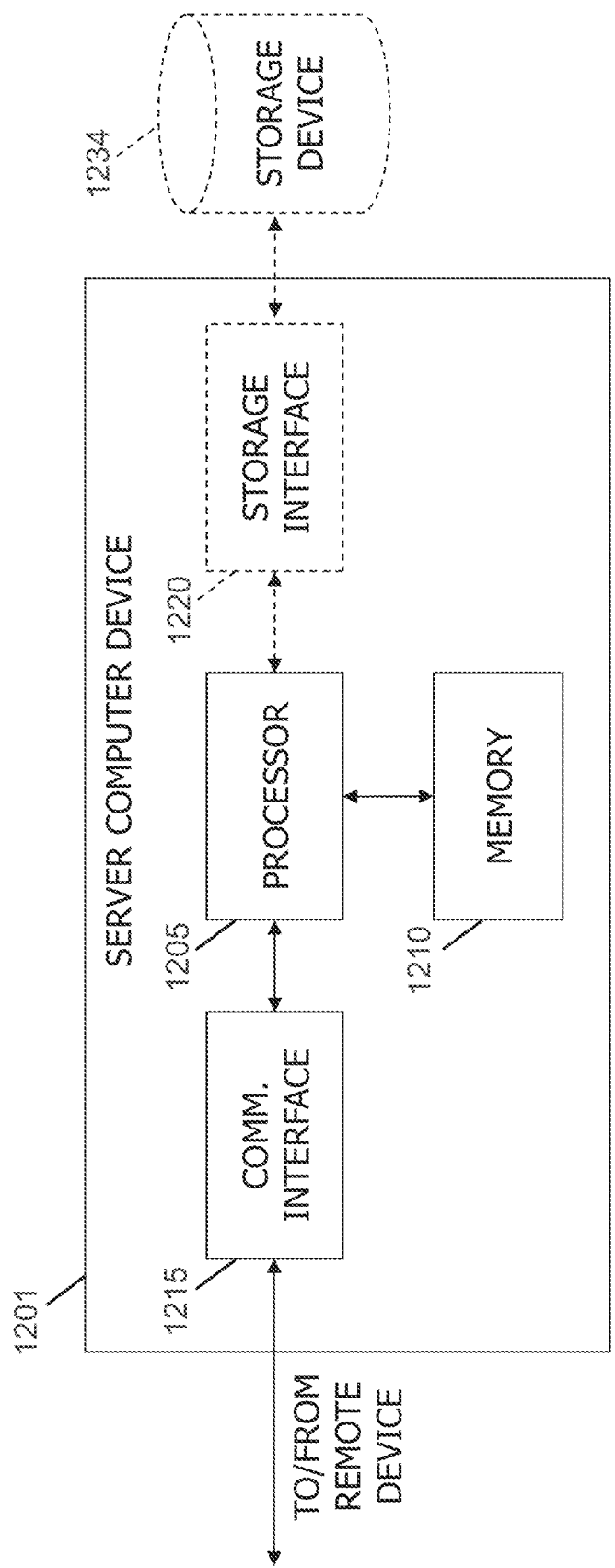
FIG. 12 illustrates an example configuration of the server system, in accordance with one embodiment of the present disclosure.

FIG. 12 illustrates an example configuration of the server system, in accordance with one embodiment of the present disclosure. Server computer device 1201 may include, but is not limited to, standards agent 105 (shown in FIG. 1), IA server 1010, and standards organization server 1025 (both shown in FIG. 10). Server computer device 1201 also includes a processor 1205 for executing instructions. Instructions may be stored in a memory area 1210. Processor 1205 may include one or more processing units (e.g., in a multi-core configuration).

Processor 1205 is operatively coupled to a communication interface 1215 such that server computer device 1201 is capable of communicating with a remote device such as another server computer device 1201, stakeholder computer device 1005 (shown in FIG. 10), or standard organization server 1025. For example, communication interface 1215 may receive requests from stakeholder computer devices 1005 via the Internet.

Processor 1205 may also be operatively coupled to a storage device 1234. Storage device 1234 is any computer-operated hardware suitable for storing and/or retrieving data, such as, but not limited to, data associated with database 145 (shown in FIG. 1). In some embodiments, storage device 1234 is integrated in server computer device 1201. For example, server computer device 1201 may include one or more hard disk drives as storage device 1234. In other embodiments, storage device 1234 is external to server computer device 1201 and may be accessed by a plurality of server computer devices 1201. For example, storage device 1234 may include a storage area network (SAN), a network attached storage (NAS) system, and/or multiple storage units such as hard disks and/or solid state disks in a redundant array of inexpensive disks (RAID) configuration.

In some embodiments, processor 1205 is operatively coupled to storage device 1234 via a storage interface 1220. Storage interface 1220 is any component capable of providing processor 1205 with access to storage device 1234. Storage interface 1220 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1205 with access to storage device 1234.

Processor 1205 executes computer-executable instructions for implementing aspects of the disclosure. In some embodiments, the processor 1205 is transformed into a special purpose microprocessor by executing computer-executable instructions or by otherwise being programmed. For example, the processor 1205 is programmed with the instructions such as processes 100, 200, 300, 400, and 900 (shown in FIGS. 1-4 and 9, respectively).

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on computer systems or mobile devices, or associated with or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., vehicle profiles, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

The present systems and methods are further advantageous over conventional techniques the embodiments herein are not confined to a single ecosystem, but may instead allow for versatile operation within multiple ecosystems. Accordingly, these novel techniques are of particular value to communication interface manufacturers who desire to have devices deployable within a variety of ecosystems, such as OCF, AllSeen/AllJoyn, Nest/Thread, Zigbee. Such devices are thus readily available for deployment in any of the anticipated ecosystems, but the manufacturer need not be concerned of the unknown costs of a device that may be deployed within multiple ecosystems.

Exemplary embodiments of systems and methods for analyzing communication interface designs are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant personal belonging and/or home feature information for customers from mobile device sensors, vehicle-mounted sensors, home-mounted sensors, and/or other sensor data, vehicle or home telematics data, image data, and/or other data.

In one embodiment, a processing element may be trained by providing it with a large sample of conventional analog and/or digital, still and/or moving (i.e., video) image data, telematics data, and/or other data of belongings, household goods, durable goods, appliances, electronics, homes, etc. with known characteristics or features. Such information may include, for example, make or manufacturer and model information.

Based upon these analyses, the processing element may learn how to identify characteristics and patterns that may then be applied to analyzing sensor data, vehicle or home telematics data, image data, mobile device data, and/or other data.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A server device for analyzing communication interfaces, comprising:
   a processor; and
   a memory configured to store computer-executable instructions, when executed by the processor, cause the server device to:
      store a plurality of test scenarios from a plurality of sources;
      receive a plurality of proposed interfaces from the plurality of sources;
      generate a model based on the plurality of test scenarios;
      for each of the plurality of proposed interfaces, execute the model to simulate operation of the proposed interface to execute the plurality of test scenarios using the corresponding proposed interface of the plurality of proposed interfaces;
      score the plurality of proposed interfaces based on the execution of the plurality of test scenarios for the corresponding interface; and
      provide the plurality of scores for the plurality of proposed interfaces to the plurality of sources.

2. The server device of claim 1, wherein the instructions further cause the server device to:
   receive an updated proposal from a first source of the plurality of sources;
   execute the plurality of test scenarios using the updated proposal; and
   score the updated proposal based on the execution.

3. The server device of claim 2, wherein the instructions further cause the server device to compare the updated proposal to the plurality of proposed interfaces.

4. The server device of claim 1, wherein the instructions further cause the server device to rank the plurality of proposed interfaces based on the plurality of scores.

5. The server device of claim 4, wherein the instructions further cause the server device to discard a portion of the plurality of proposed interfaces based on the ranking.

6. The server device of claim 5, wherein the instructions further cause the server device to generate one or more updated interface proposals based on the remaining portion of the plurality of proposed interfaces.

7. The server device of claim 6, wherein the one or more updated interface proposals are generated using genetic algorithms.

8. The server device of claim 6, wherein the one or more updated interface proposals are generated using predetermined crossover points.

9. The server device of claim 8, wherein the predetermined crossover points are based on attributes of the communication interface.

10. The server device of claim 1, wherein the communication interface combines at least one encoder and a modulator.

11. The server device of claim 10, wherein the communication interface is for a cable modem.

12. The server device of claim 1, wherein the communication interface combines at least one decoder and a demodulator.

13. The server device of claim 12, wherein the communication interface is for a cable modem termination system.

14. The server device of claim 1, wherein the plurality of sources are a plurality of computer devices associated with a plurality of stakeholders in the design of the communication interface.

15. The server device of claim 1, wherein a first test scenario of the plurality of test scenarios is submitted by a standard setting organization.

16. The server device of claim 1, wherein the instructions further cause the server device to:
   receive the plurality of test scenarios from the plurality of sources;
   transmit the plurality of test scenarios to each of the plurality of sources;
   receive votes for the plurality of test scenarios from the plurality of sources; and
   rank the plurality of test scenarios based on the plurality of votes.

17. The server device of claim 16, wherein the instructions further cause the server device to:
   filter the plurality of test scenarios based on the rankings to remove a subset of the plurality of test scenarios; and
   execute the remaining plurality of test scenarios using the plurality of interface proposals.

18. The server device of claim 1, wherein the instructions further cause the server device to execute a plurality of rounds of analysis, wherein the plurality of test scenarios are executed with a current set of interface proposals in each round of the plurality of rounds of analysis.

19. The method for analyzing communication interfaces, comprising:
   storing a plurality of test scenarios from a plurality of sources;
   receiving a plurality of proposed interfaces from the plurality of sources;
   generating a model based on the plurality of test scenarios;
   for each of the plurality of proposed interfaces, executing the model to simulate operation of the proposed interface to execute the plurality of test scenarios using the corresponding proposed interface of the plurality of proposed interfaces;
   scoring the plurality of proposed interfaces based on the execution of the plurality of test scenarios for the corresponding interface; and
   providing the plurality of scores for the plurality of proposed interfaces to the plurality of sources.

20. A server device for analyzing communication interfaces, comprising:
a processor; and
a memory configured to store computer-executable instructions, when executed by the processor, cause the server device to:
store a plurality of test scenarios from a plurality of sources;
receive a plurality of proposed interfaces from the plurality of sources;
for each of the plurality of proposed interfaces, execute the plurality of test scenarios using the corresponding proposed interface of the plurality of proposed interfaces;
score the plurality of proposed interfaces based on the execution of the plurality of test scenarios for the corresponding interface;
rank the plurality of proposed interfaces based on the plurality of scores;
discard a portion of the plurality of proposed interfaces based on the ranking; and
provide the plurality of scores for the plurality of proposed interfaces to the plurality of sources.

* * * * *